United States Patent [19]

Drexler et al.

[11] 4,343,879
[45] Aug. 10, 1982

[54] MULTIPLE LAYER OPTICAL DATA STORAGE AND RECORDING MEDIA

[75] Inventors: Jerome Drexler, Los Altos Hills; Eric W. Bouldin, Woodside, both of Calif.

[73] Assignee: Drexler Technology Corporation, Mountain View, Calif.

[21] Appl. No.: 181,378

[22] Filed: Aug. 22, 1980

[51] Int. Cl.[3] .................... G03C 1/02; G03C 1/76; G03C 1/84; G01D 15/14
[52] U.S. Cl. .................................... 430/14; 430/9; 430/16; 430/346; 430/414; 430/416; 430/510; 430/616; 430/945; 428/913; 346/1.1; 346/76 L; 346/135.1; 430/523; 430/531
[58] Field of Search ............... 430/510, 945, 346, 9, 430/14, 16, 414, 416, 616, 523, 531; 346/1.1, 76 L, 135.1; 428/913

[56] References Cited
U.S. PATENT DOCUMENTS

| | | |
|---|---|---|
| 3,607,276 | 9/1971 | Odde . |
| 3,889,272 | 6/1975 | Lou et al. ............................ 346/1 |
| 3,911,444 | 10/1975 | Lou et al. ............................ 346/1 |
| 3,971,874 | 7/1976 | Ohta et al. ...................... 346/76 L |
| 3,990,084 | 11/1976 | Lou et al. ....................... 346/76 L |
| 4,000,492 | 12/1976 | Willens ............................... 346/1 |
| 4,176,277 | 11/1979 | Bricot et al. ................... 250/316.1 |
| 4,178,214 | 2/1980 | Kido et al. ..................... 346/76 L |
| 4,230,939 | 10/1980 | de Bont et al. ................... 430/945 |
| 4,269,917 | 5/1981 | Drexler ............................ 430/945 |

*Primary Examiner*—Charles L. Bowers, Jr.

[57] ABSTRACT

A laser recording medium consisting of shiny silver particles in a colloid matrix having at least one superposed layer of colloid matrix containing dispersed metal particles other than silver to lower the reflectivity of the medium.

8 Claims, 2 Drawing Figures

MULTIPLE LAYER OPTICAL DATA STORAGE AND RECORDING MEDIA

CROSS REFERENCE TO RELATED APPLICATION

This is a continuation-in-part of patent application Ser. No. 55,270, filed July 6, 1979, now U.S. Pat. No. 4,278,756.

TECHNICAL FIELD

The present invention relates to an improved reflective optical data storage medium which permits instant laser recording without processing, derived from photosensitive materials.

BACKGROUND ART

Since the early 1970s, when optical data storage and recording first became practical, a large number of patents has issued describing such media. Generally, optical data storage and recording media may be typified as either reflective or absorptive in nature. Reflective media have a reflective surface whose reflectivity is altered to encode data. Absorptive media has an opaque absorptive surface whose opacity is altered to encode data. There is one particular type of media that permits instant laser recording without processing. It is sometimes referred to as direct-read-after-write, or DRAW, media.

U.S. Pat. No. 3,889,272, issued June 10, 1975, to Lou and Willens of Bell Telephone Laboratories describes the use of a thin metal film and an anti-reflection layer to make a reflective optical data recording medium. The thin continuous conductive metal layer is partially melted by laser pulses, thereby encoding data. The anti-reflection layer is disposed atop the metal film and is composed of metal crystallites.

U.S. Pat. No. 3,911,444, issued Oct. 7, 1975, to Lou, Watson and Willens of Bell Telephone Laboratories describes the use of a relective metal film disposed atop a plastic film. Again, the metal film used in this patent, as with all of the other metal films mentioned in this prior art section, is a continuous and electrically conductive film, usually deposited by vacuum sputtering or evaporation.

U.S. Pat. No. 3,971,874, issued July 27, 1976, to Ohta and Takenaga of Matsushita Electric Industrial Company describes the use of a thin reflective film of tellurium oxide. Tellurium oxide is vacuum deposited onto a transparent base. Initially, the tellurium oxide is brown in color, and laser recording is possible by either heating the tellurium oxide so that it changes color or by melting the tellurium oxide and thereby forming a hole.

U.S. Pat. No. 3,990,084, issued Nov. 2, 1976, to Hamisch and Kaiser of Robert Bosch Company describes the use of a thin reflective metal film of bismuth and selenium to form a thin metal film for laser recording.

U.S. Pat. No. 4,000,492, issued Dec. 28, 1976, to Willens of Bell Telephone Laboratories describes a recording medium comprising a reflective radiation absorbing metal film disposed on a transparent substrate. The novel aspect of this patent is the reduction in laser energy required to create holes in the metal film by the introduction of an anti-reflection layer between the thin metal film and the incident radiation. The purpose of the anti-reflection layer is to substantially increase the amount of energy absorbed from incident laser radiation. The anti-reflection layer consists of $BiS_3$, $SbS_3$, or Se.

RCA has announced a trilayer system which consists of a dark, absorptive surface layer; a transparent layer; and a thin, continuous metal layer. A laser burns through the absorptive layer to record data which will be read as a reflective spot in a dark field.

Eastman Kodak Company has recently disclosed a solvent coatable reflective optical data storage medium which consists of a dye filled layer disposed atop a thin, reflective, continuous metal layer. A recording laser beam is absorbed by the dyed layer, melting it. The dyed layer is transparent to the reading laser, allowing the data to be read as differential phase shifts.

All of the above mentioned prior art discloses the use of a continuous electrically conducting thin metal film to form a reflective optical data storage and recording medium.

U.S. Pat. No. 4,176,277, issued Nov. 27, 1979, to Bricot, et al. of Thomson-Brandt describes the use of a thin metal film disposed atop a thermally deformable plastic. When a small localized area of the thin metal film is heated to a high temperature, for example by a laser, the thermally deformable plastic immediately below the heated area of the metal film deforms thereby encoding data.

U.S. Pat. No. 4,188,214, issued Feb. 12, 1980, to Kido, et al. of Fuji Photo Film Company describes the use of a thin metal film combined with one or more metal sulfides. The addition of metal sulfides increases the absorptivity of the thin metal film to incident recording radiation.

U.S. patent application Ser. No. 55,270, filed July 6, 1979, now U.S. Pat. No. 4,278,756, by Bouldin and Drexler of Drexler Technology Corporation, describes a method of making reflective, electrically non-conductive, silver optical data storage and recording materials. A fine grained silver-halide emulsion photosensitive material has latent images created in it, and subsequently the silver halide is subjected to solution physical development. This solution physical development creates reflective non-filamentary silver particles which form the reflective recording and data storage surface. This is a direct-read-after-write media.

Accordingly, it is an object of the present invention to achieve a more sensitive and versatile reflective optical data storage and recording medium. Another object of the present invention is to create a reflective optical data storage and recording medium using reflective read methods over a wavelength range of 440 nanometers to 830 nanometers, those wavelengths being the most common wavelengths for laser sources in the visible and near-infrared.

DISCLOSURE OF INVENTION

The present invention is a reflective optical data storage and recording medium wherein reflective metal particles are dispersed in a low melting temperature suspensive colloid. These metal particles are very small, on the order of 50 to 350 angstroms in diameter. The metal particles may all be of one metal, or a combination of two or more metals. The metal particles are uniformly dispersed in such a fashion that the resulting medium is reflective either before or after recording and electrically non-conductive.

A major advantage of the present invention over the above cited prior art is that recording is accomplished by directly melting the suspensive colloid at a low melting temperature, not by melting the metal. A number of arrangements is possible for the disposition of metal particles. For example, the optical data storage and recording medium may have a recording and storage layer consisting of one or more metals dispersed uniformly throughout a suspensive matrix. It may be useful in this configuration to have more of one metal than another in the recording and storage layer, resulting in a disproportionate distribution. The recording and storage layer of the present invention consists of two or more layers of the same or different particles. In this case, the layers may be in intimate contact or separated by a transparent layer. When it is necessary to reduce surface reflectivity and increase absorptivity and optical density, it is possible to incorporate metal particles having an alternative absorptive crystal structure, or to incorporate metal sulfide particles.

These structures allow for a wide range of surface reflectivity, absorption and recording sensitivity. For example, it is desirable in some applications to be able to record both through the substrate and from above the reflective surface. This may be accomplished by making an article having a transparent supporting substrate, atop which is disposed a transparent layer of suspensive colloid, atop which is disposed a layer of suspensive colloid containing very small reflective metal particles of one or more elements, which in turn is covered by another layer of transparent suspensive colloid. Alternatively, the transparent suspensive colloid layers may contain a dye for absorbing coherent recording. After melting holes with a laser in the metal filled or dye filled colloid layer, the data may be read by changes, for example, in reflectivity of a reflective surface or the phase shift through a spot of melted or unmelted colloid.

The starting material which forms the basis of the present invention is that described in U.S. patent application Ser. No. 55,270, now U.S. Pat. No. 4,278,756. Specifically a silver-halide photosensitive medium is exposed to solution physical development whereby reflective silver particles are made. Atop this reflective silver layer is disposed at least one layer of low melting temperature suspensive colloid which contains either reflective metal particles, metal sulfides or a dye. The photographic and photoplate industries have amassed substantial knowledge in the application of colloid layers to other colloid layers. A typical example is the color tone correcting stripping film which has three or more gelatin layers disposed atop one another. The dispersion of metal particles or metal sulfides is also known. One exemplary method is dispersing an even layer of finely ground (on the order of 0.05 microns) particles in the colloid layer prior to curing. As the layer cures, the metal particles are incorporated therein.

BEST MODE FOR CARRYING OUT THE INVENTION

Figure 1:
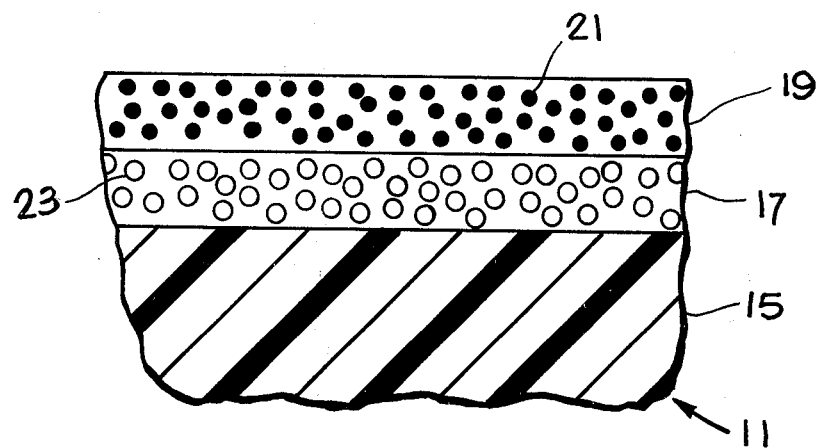
FIG. 1 is a side-sectional view of the optical data storage and recording medium of the present invention.

The present invention is a reflective optical data storage and recording medium having extreme versatility, comprising very small reflective metal particles dispersed in one or more layers of a low melting temperature suspensive colloid. These very small reflective metal particles are on the order of 50 to 350 angstroms in diameter, although for some purposes smaller or larger particle sizes may be useful. The reflectivity of a layer of the reflective metal particles could fall within the range of 20% to 80%. In some applications, it may be useful to utilize metal particles having different reflectivities so that it is possible to vary the overall reflectivity of the resulting optical data storage and recording medium. In other applications, a low reflectivity may be useful. This is accomplished by incorporating metal sulfides or absorptive crystalline metal particles in the colloid layer.

These very small reflective metal particles are dispersed in a low melting temperature suspensive colloid. Such dispersal separates the individual particles so that the recording and storage layer is electrically non-conductive. As used herein, electrically non-conductive means that there is a minimum resistance of 1 million ohms per one linear inch created by the array of metal particles. Clearly, if the distance between metal particles is sufficiently small, the recording and storage layer will become electrically conductive. Virtually any metal solid at ambient operating temperatures, may be used to form the reflective metal particles. Liquid metals, for example mercury, are unuseable. The major drawback of electrical conductivity is that it also allows for thermal conductivity, thereby decreasing sensitivity for recording purposes by conducting heat away from the point of recording. Indeed, the thin metal films of the above cited prior art other than patent application Ser. No. 55,270, now U.S. Pat. No. 4,278,756 are all electrically conductive; and where the thin metal film is created by vacuum sputtering, the metal particles which are sputtered on are in intimate contact with each other and not dispersed.

The low melting temperature suspensive colloid supports the dispersed small reflective metal particles. In the present invention, the melting point of the low melting temperature colloid is generally between 40° C. and 300° C., although any colloid having a melting temperature below that of the metal it contains may be used. When the optical data storage and recording medium of the present invention is used for laser recording, the suspensive colloid is melted, thereby either reducing reflectivity in the melted area or opening an aperture in an opaque layer to expose a reflective underlayer. Unlike the above-cited prior art, with the exception of patent application Ser. No. 55,270 and the Eastman Kodak solvent coatable optical data storage medium, it is unnecessary for the recording laser beam to heat a spot on a conductive metal film as part of the recording process. The following table of compounds is exemplary of low melting temperature suspensive colloids:

Gelatin
Polyvinyl alcohol and its esters and acetals
Partial esters of polyvinyl alcohol
Polyvinylpyrrolidene
Acrylamide-maleic acid mixtures
Polyamide-acid mixtures
Mixed polymers of acrylamide-acrylic acid
Polyacrylamide
Polyvinylpyridines and cellulose derivatives
Cellulose phthalate ethers With reference to FIG. 1, the optical data storage and recording medium of the present invention consists of at least two layers of low melting temperature suspensive colloid, where each layer may have dispersed therein very small reflective metal particles and at least one layer contains silver. FIG. 1 shows a cross-sectional view of an optical data storage and recording medium in accord with the present invention. Medium 11 is comprised of a supporting substrate, 15, atop which are disposed two low melting temperature suspensive colloidal layers, 17 and 19. Dispersed in each of these two layers are very small reflective metal particles, 21 and 23, though either layer may not contain metal particles but rather may be transparent or dyed. The low melting temperature suspensive colloid layers are 10 microns or less in thickness, although for very high density recording it is more useful to have a total thickness on the order of one-tenth micron. The very small reflective particles, 21 and 23, are evenly distributed throughout their respective layers. This uniform distribution creates a uniform reflective surface, which is advantageous in laser recording and data reading. Supporting substrate, 15, is generally transparent, although it is possible and in some applications more practical to use an opaque substrate. The supporting substrate should be dimensionally stable in both the reading and recording modes for very high density recording. For example, if the optical data storage and recording medium is a videodisc, it will be rotated at approximately 1500 rpm. If the modulus of elasticity and orthogonal directions is not the same, such as in the case of extruded plastics, the substrate will stretch, causing problems in data reading and writing. However, such materials can be used at lower rotating speeds or for larger data spots. Also, sheets of such materials may be bonded orthogonal to one another to balance out the anisotropies in elasticity. Generally, glass cast plastics are preferred substrates for rotating discs.

The very small reflective metal particles dispersed in each of the two colloidal layers are composed of different elements, or different crystal structures. Since different elements and different particle sizes have different absorptivities, it is possible to create an optical data storage and recording medium which would meet virtually any desirable reflectivity, absorptivity, or opacity specifications.

In accord with the present invention, at least one layer of suspensive colloid must contain silver. To obtain this layer of silver, it is preferable to start with the finished product of the prior invention disclosed in co-pending U.S. application Ser. No. 55,270 now U.S. Pat. No. 4,278,756. In that application a reflective optical data storage and recording medium is made by silver diffusion transfer. This process starts out with commercially available silver-halide photosensitive media.

A very thin, highly reflective surface may be formed by the diffusion transfer of complexed silver ions to a layer of silver precipitating nuclei. This reflective layer is electrically non-conducting and has low thermal conductivity and may be patterned photographically, these latter two properties being highly desirable for laser recording media. The complexed silver ions are created by reaction of an appropriate chemical and the silver halide used in conventional silver-halide emulsions. A developing or reducing agent must be included in this solution to permit the complexed silver ions to be precipitated in the nuclei layer. The combination of developing agent and silver complexing solvent in one solution is called a monobath solution. Preferred monobath formulations for highly reflective surfaces include a developing agent which may be characterized as having low activity. The specific type of developing agent selected appears to be less critical than the activity level as determined by developer concentration and pH.

The developing agent should have a redox potential sufficient for causing silver ion reduction and adsorption or agglomeration on silver nuclei. The concentration of the developing agent and the pH of the monobath should not cause filamentary silver growth which gives a black low reflectivity appearance. The developed silver particles should have a geometric shape, such as a spherical or hexagonal shape which when concentrated form a good reflectivity surface.

Developing agents having the preferred characteristics are well known in the art and almost any photographic developing agent can be made to work by selection of concentration, pH and silver complexing agent, such that there is no chemical reaction between the developing agent and complexing agent. It is well known that photographic developing agents require an antioxidant to preserve them. The following developing agent/antioxidant combinations produced the typical indicated reflectivities for exposed and monobath developed Agfa-Gevaert "HD Millimask" photoplates.

| For Monobaths Using Na(SCN) As a Solvent And Silver Complexing Agent | | |
|---|---|---|
| Developing Agent | Antioxidant | Approximate Maximum Reflectivity |
| p-methylaminophenol | Ascorbic Acid | 46% |
| p-methylaminophenyl | Sulfite | 37% |
| Ascorbic Acid | — | 10% |
| p-Phenylenediamine | Ascorbic Acid | 24% |
| Hydroquinone | Sulfite | 10% |
| Catechol | Sulfite | 60% |

| For Monobaths Using NH$_4$OH As a Solvent And Silver Complexing Agent | | |
|---|---|---|
| Developing Agent | Antioxidant | Typical Reflectivity |
| Hydroquinone | Sulfite | 25% |
| Catechol | Sulfite | 30% |

The preferred solvents/silver complexing agents, which must be compatible with the developing agent, are mixed therewith, in proportions promoting the complete diffusion transfer process within reasonably short times, such as a few minutes. Such silver complexing agents in practical volume concentrations should be able to dissolve essentially all of the silver halide of a fine grain emulsion in just a few minutes. The solvent should not react with the developing silver grains to dissolve them or to form silver sulfide since this tends to create non-reflective silver. The solvent should be such that the specific rate of reduction of its silver complex at the silver nuclei layer is adequately fast even in the presence of developers of low activity, which are preferred to avoid the creation of low-reflectivity black filamentary silver in the initial development of the surface latent image.

The following chemicals act as silver-halide solvents and silver complexing agents in solution physical development. They are grouped approximately according to their rate of solution physical development; that is, the amount of silver deposited per unit time on precipitating nuclei, when used with a p-methylaminophenol-ascorbic acid developing agent.

| Most Active |
| --- |
| Thiocyanates (ammonium, potassium, sodium, etc.) |
| Thiosulphates (ammonium, potassium, sodium, etc) |
| Ammonium hydroxide |
| Moderately Active |
| αpicolinium - βphenylethyl bromide |
| Ethylenediamine |
| 2-Aminophenol furane |
| n-Butylamine |
| 2-Aminophenol thiophene |
| Isopropylamine |
| Much Less Active |
| Hydroxylamine sulfate |
| Potassium chloride |
| Potassium bromide |
| Triethylamine |
| Sodium sulfite |

From the above it can be seen that the thiocyanates and ammonium hydroxide are amongst the most active solvents/complexing agents. While almost all developers suitable for solution physical development can be made to work in the silver diffusion transfer process of the present invention with the proper concentration and pH, not all solvents/complexing agents will work within the desired short development time or in the proper manner. For example, the thiosulfate salts, the most common silver-halide solvent used in photography and in Polaroid-Land black and white instant photography's diffusion transfer process, does not work in this process for two reasons. Its complexed silver ions are so stable that it requires a strong reducing agent to precipitate the silver on the nuclei, and this strong reducing or developing agent would have the undesirable effect of developing low reflective black filamentary silver. It has another undesirable effect, also exhibited by the solvent thiourea; namely, that it forms black, low reflecting silver sulfide with the developing silver grains. On the other hand in the black and white Polaroid-Land process black silver is a desirable result. Sodium cyanide is not recommended, even though it is an excellent silverhalide solvent, because it is also an excellent solvent of metallic silver and would thus etch away the forming image. It is also about 50 times as toxic as sodium thiocyanate, which is a common photographic reagent.

The process chemicals can be applied by a variety of methods, such as by immersion, doctor blades, capillary applicators, spin-spray processors and the like. The amount of processing chemicals and temperature thereof should be controlled to control reflectivity. Preferably, the molar weight of the developing agent is less than 7% of the molar weight of the solvent since higher concentrations of developing agent can lead to low reflective filamentary silver growth.

The concentration of the solvent in the form of a soluble thiocyanate or ammonium hydroxide should be more than 10 grams per liter but less than 45 grams per liter. If the concentration is too low the solvent would not be able to convert the halide to a silver complex within a short process time and if the solvent concentration is too great the latent image will not be adequately developed into the necessary silver precipitating nuclei causing much of the silver complex to stay in solution rather than be precipitated. The process by which the silver complex is reduced at the silver precipitating nuclei and builds up the size of the nuclei is called solution physical development.

It is important to note that in solution physical development, as used herein, the silver particles do not grow as filamentary silver as in direct or chemical development, but instead grow roughly equally in all directions, resulting in a developed image composed of compact, rounded particles. As the particles grow, a transition to a hexagonal form is often observed. If the emulsion being developed has an extremely high density of silver nuclei to build upon and there is sufficient silver-halide material to be dissolved, then eventually the spheres will grow until some contact other spheres forming aggregates of several spheres or hexagons. As this process takes place the light transmitted through this medium initially takes on a yellowish appearance when the grains are very small. This changes to a red appearance as the particles build up in size and eventually will take on a metallic-like reflectivity as the aggregates form.

In summary, silver precipitating nuclei are formed on one of the surfaces of a silver-halide emulsion either in the emulsion manufacturing process, by actinic radiation, or by a fogging agent; and if this emulsion is then developed in a monobath solution containing a weak developer and a very fast solvent which forms complexed silver ions which are readily precipitated by catalytic action of silver nuclei; and if the solvent does not form silver sulfide; then a reflective coating is developed on one of the emulsion surfaces thereby creating a medium for data storage and laser recording. Any of the common developing agents will work whereas only a small number of solvents/complexing agents have all of the desired properties, the most successful of these being the soluble thiocyanates and ammonium hydroxide.

Atop this layer of silver is disposed one or more layers of metal particles or a dye, suspended in a low melting temperature colloid. These layers are applied in the conventional photographic-photoplate manner, save that metal particles are dispersed in the colloid prior to curing. Alternatively, a dye may be added prior to curing, in place of or in addition to metal particles. Since metal particles have a greater density than the uncured colloid, the metal particles will penetrate the colloid layer and become incorporated therein. Alternatively, layer 17 may contain suspended metal particles and layer 19 contain reflective silver particles. Layer 17 may be applied to substrate 15 in the conventional photographic-photoplate manner and have metal particles distributed therein. Layer 19 may be similarly disposed atop layer 17 and would contain photosensitive silver halide. Layer 19 would then be treated as described above to produce reflective silver.

Figure 2:
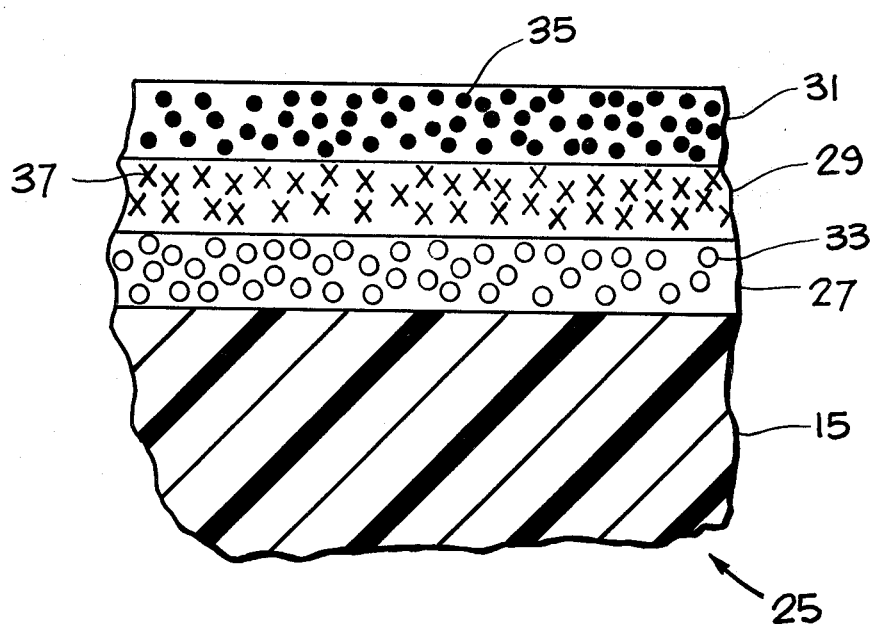
FIG. 2 is a side-sectional view of an alternative optical data storage and recording medium of the present invention.

FIG. 2 is a side-sectional view of an alternative method of the present invention which consists of three low melting temperature suspensive colloidal layers. Optical data storage and recording medium, 25, consists of supporting substrate, 15, atop which are disposed three low melting temperature colloidal layers, 27, 29 and 31. It is not necessary that all three layers contain very small reflective metal particles, but that at least one of the colloidal layers does. In one alternative medium of the present invention, metal particles 35 are composed of a different element than those of 33. Alternatively, particles 35 may be metal sulfide particles or filamentary silver particles, and reflective metal particles 33 may be silver. This would allow for an optical data storage and recording medium whose unrecorded appearance would be dark, but wherein data would be recorded to create reflective spots. A recording laser would burn through the absorptive sulfide or filamentary silver layer, 31, and reveal reflective layer, 27. In this configuration, it would be advantageous for layer 29 to consist of a relatively higher melting temperature material so that the recording laser would not significantly melt it.

In an alternative optical data storage and recording medium, layer 29 would contain reflective silver particles, 37, and layers 27 and 31 would be either transparent or dyed. When layers 27 and 31 are transparent and if the substrate, 15, is also transparent, it would be possible to record through the substrate. The recording laser beam would be focused on the reflective metal particles in layer 29 either through the substrate or from above the substrate. Recording through the substrate has two advantages. First, it would be possible to read the data either through the substrate or from above; and second, if reading were to be done from above, a glass protective coverplate could be placed atop layer 31 and any Newton rings which would result would have a reduced effect upon reading owing to layer 31.

When layers 31 and 27 contain a dye, it is possible to read the resulting medium by phase shift at a wavelength where the dye is not absorptive. An optical data storage and recording medium of this sort could be prepared as follows. A high-density photosensitive silver-halide photographic medium, for example a photoplate using gelatin as a colloidal carrier, could be treated with sodium thiocyanate to remove the silver halide from the upper third of the photosensitive emulsion. A thin layer of silver precipitating nuclei is made in the remaining silver halide such that the greater density of precipitating nuclei is distal to the substrate. The entire silver-halide photosensitive medium would then be treated as described in co-pending patent application Ser. No. 55,270 now U.S. Pat. No. 4,278,756. This creates a thin layer of reflective silver approximately midway between the air-gelatin and the substrate-gelatin interfaces. Subsequently, the entire emulsion layer could be dyed. If the dye is red in color, recording could be accomplished with a blue or perhaps a green laser. Typically the red dye would have an optical density of 0.5 to 1.5 in the blue and less than 0.25 in the red. This laser would melt the dyed gelatin and not affect the reflective layer. Data reading would be accomplished with a red or infrared laser which would detect a phase shift in those areas where the gelatin was ablated away by the recording laser. In an alternative method, the narrow band absorptive dye could be replaced by a uniform low density distribution of fine particles of metal 150 to 350 angstroms in size, which would create a red transparent layer with a typical optical density of under 0.25 in the red which would be highly absorptive in the blue and green with a typical optical density of 0.5 to 1.5.

In adding the metal particles the reflective character of the very thin, highly reflective silver particle surface, previously described, is modified. In general, the silver surface will become less reflective with the addition of the particles. The extent of reduction of reflectivity depends upon the metal and its concentration within the supporting colloid. This reduction in reflectivity increases the efficiency of the laser recording medium. A minimum reflectivity should be maintained so that a satisfactory contrast ratio exists for the selected laser wavelength and power.

We claim:

1. An optical data storage and recording medium, comprising
   a supporting substrate,
   at least a first layer of low melting temperature suspensive colloid disposed on said substrate, said layer for recording and storing optically written data, wherein said suspensive colloid contains a uniform areawise distribution of very small, non-filamentary, reflective silver particles dispersed in said suspensive colloid, having a diameter primarily less than 350 angstroms and greater than 50 angstroms, said layer being 20% to 80% reflective of light and being electrically non-conducting, and
   at least one layer of low melting temperature suspensive colloid disposed atop said silver metal layer, containing dispersed, very small reflective metal particles having a diameter primarily less than 350 angstroms and larger than 50 angstroms, said metal particles comprising at least one metal other than silver which is solid at ambient temperatures, said layer having a particle concentration for reducing the reflectivity of said first layer to a desired degree.

2. The optical data storage and recording medium of claim 1, wherein said substrate is transparent.

3. The optical data storage and recording medium of claim 1, wherein at least one of said colloid layers contains an absorptive dye.

4. The optical data storage and recording medium of claim 1, wherein said other metal is a metal sulfide.

5. An optical data storage and recording medium, comprising
   a supporting substrate,
   at least a first layer of low melting temperature suspensive colloid disposed on said substrate wherein said suspensive colloid contains very small reflective metal particles, having a diameter primarily less than 350 angstroms and larger than 50 angstroms, said metal particles comprising at least one metal other than silver which is solid at ambient temperatures, said layer being 20% to 80% reflective of light,
   and at least one layer of low melting temperature suspensive colloid disposed atop said metal containing layer wherein said suspensive colloid contains very small reflective silver particles dispersed in said suspensive colloid, having a diameter primarily less than 350 angstroms and larger than 50 angstroms, said layer having a particle concentration for reducing the reflectivity of said first layer to a desired degree.

6. The optical data storage and recording medium of claim 5, wherein said substrate is transparent.

7. The optical data storage and recording medium of claim 5, wherein at least one of said colloid layers contains an absorptive dye.

8. The optical data storage and recording medium of claim 5, wherein said other metal is a metal sulfide.

* * * * *